Nov. 6, 1962   F. ZANDMAN ETAL   3,062,087
APPARATUS FOR INVESTIGATING POLARIZED LIGHT PHENOMENA
Filed April 2, 1957
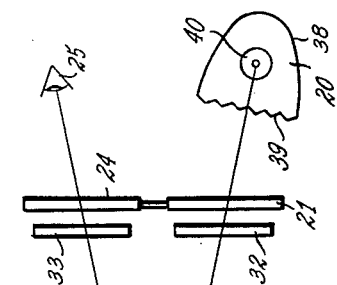
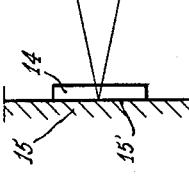
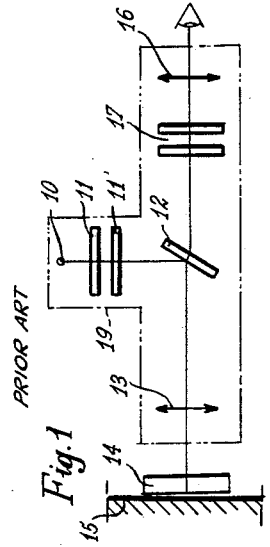
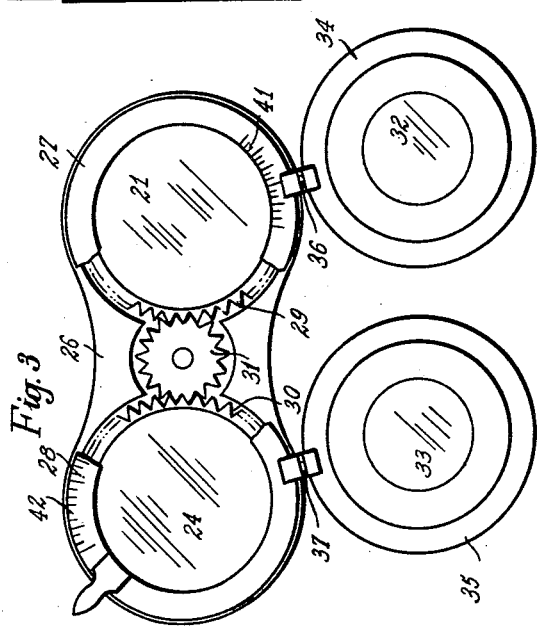
INVENTORS
FELIX ZANDMAN
JEAN AVRIL
BY Darby & Darby
ATTORNEYS United States Patent Office 3,062,087
Patented Nov. 6, 1962

3,062,087
APPARATUS FOR INVESTIGATING POLARIZED
LIGHT PHENOMENA
Felix Zandman, Paris, and Jean Avril, Boulogne, France, assignors, by mesne assignments, to The Budd Company, Philadelphia, Pa., a corporation of Pennsylvania
Filed Apr. 2, 1957, Ser. No. 650,194
Claims priority, application France Apr. 9, 1956
2 Claims. (Cl. 88—14)

The invention relates to apparatus for the investigation of phenomena involving polarized light. Heretofore so-called polariscope instruments were generally used for such investigation. These instruments, owing to the very strict specifications that have to be followed in operating them and also as a result of their inherent design, are practically restricted to laboratory use; they are heavy, cumbersome and delicate to manipulate. The apparatus of the invention in contrast while yielding sufficiently accurate results for most practical applications is lightweight, small in size, and is of a character to be put into the hands not only of research personnel but also of less skilled operators, thereby making it possible to apply polarization phenomena to a wide range of practical uses.

In the ensuing exemplary description reference is made to the accompanying drawings, wherein:

FIG. 1 is a diagrammatic view of a conventional apparatus;

FIG. 2 is a schematic view of apparatus of the invention;

FIG. 3 is a front view of said apparatus with some parts removed;

FIG. 4 is a corresponding side view.

It will be recalled that polariscopes or photo-elasticimeters whether operating by reflection or of ordinary type, essentially include a source of light 10 which emits rays which after having passed through a polarizer 11 of flat or circular shape (the plate 11' is a quarter-waveplate) fall upon a semi-transparent mirror 12 arranged at an angle so as to direct the beam into an objective lens 13 placed in front of the device to be tested for its polarizing influence and herein shown as comprising a bi-refrigerent element 14 disposed in front or against a reflective support 15; the reflected light follows a reverse path, again traverses the lens 13 and then the mirror 12 and is observed through an eye-piece 16 after passing an analyzer 17 of flat or circular form (e.g. a polarizer followed by a quarter-wave plate, as shown).

The fact that the beam striking the device 14—15 is a beam of parallel rays requires that the support 15 will be a reflecting support in order that the reflected light may be observed in the common direction of the incident and the reflected beam. Furthermore, the polarizer 11 and analyzer 17 have to be bodily displaced and rotated when it is desired to carry out tests or measurements, and hence such devices have to be mounted on a common unit such as the apparatus frame 19 mounted for rotation about its axis.

The apparatus of the invention is schematically illustrated in FIG. 2. It comprises a source 20 supplying a beam of light rays which desirably are not at all times strictly parallel but may assume an adjustable diverging cone angle and pass through a polarizer 21. The axis 22 of the beam of polarized light directed upon the device 14—15 to be tested, is not normal to the latter but defines a certain angle however being comparatively small. After passing through the device the light proceeds in the direction of the axis 23 different from axis 22 and, after passing analyzer 24, is viewed by the observer diagrammatically indicated at 25. Mathematical analysis demonstrates and experience confirms that by keeping the incidence angle down to a value sufficiently low though yet sufficient to ensure that the incident and reflected angles will permit of differentiating the positions of the polarizer and the analyzer in space, the angle between the axis of light propagation with respect to the faces of the birefringent body or element 14 being tested will only exert a negligibly small influence. Furthermore, it then becomes superfluous and is sometimes undesirable to provide a mirror-bright polish upon the face 15' of the support 15. A light-diffusing surface such as an ordinary metallic surface or a coat of metallic paint or the like will on the other hand be found quite satisfactory for the objects contemplated herein.

Apparatus according to the invention in one form of embodiment comprises a polarizer 21 and an analyzer 24 (FIGS. 3 and 4) juxtaposed in a casing or body 26 and means are provided, which in this instance may assume a very simplified form, for rotating the polarizer and analyzer by equal angles thereby permitting the performance of classical photo-elastimetrical measurements. Thus for example the polarizer 21 and analyzer 24 may comprise conventional circular discs inserted in respective mounts 27 and 28 between which a mechanical connection is provided of any suitable type for achieving the condition specified above. This connection may simply comprise gear teeth 29 and 30 formed on the mounts 27 and 28 with a removable pinion gear 31 interposed therebetween and meshing with both sets of teeth.

Further in accordance with the invention the apparatus may comprise permanently attached thereto by any suitable means a pair of quarter-wave plates and means for bringing said plates in registering relation respectively with the polarizer and with the analyzer. With the plates thus attached to the mounts, such plates are automatically ensured of being correctly positioned with respect to the analyzer and polarizer with regard to the function to be performed by them in the measurement (circular light and compensation tests). In the illustrated construction the quarter-wave plates 32 and 33 are secured to mounts 34 and 35 which are pivoted to the mounts 27 and 28 by pins 36 and 37 respectively. In the condition illustrated in FIG. 3, the quarter-wave plates are in idle position. During a test, when the mounts 27 and 28 are rotated about their respective axes, the quarter-wave plates participate in the rotation so that, as they are brought to their operative positions as a result of pivotal movement about their respective pivots 36 and 37, they will of their own accord and without further adjustment assume the correct relative positions with respect to the polarizer and analyzer respectively.

Preferably the apparatus further includes as an integral part thereof a light source, which may include for example a casing 38 having its front face formed by a Fresnel type lens 39 and containing a lamp 40 within it. The casing 38 is secured to the housing 26 opposite to the mount 27 and coaxially with the polarizer 21.

In operation, the light beam from polarizer 21 is directed e.g. by manual action upon the assembly which is to be tested for its action on polarized light, e.g. a photo-elastic plate or strip 14 bonded to a supporting base 15 which may be subjected to mechanical strains that are to be investigated. Then on simple visual observation of the polarization phenomena without the use of any optical lens system, both qualitative and quantitative results may readily be determined from the aspect, variations, localization and similar characteristics of the light patterns resulting from the polarization effects.

The apparatus may be constructed as a portable unit or may be designed for attachment on a stand.

For accurate quantitative measurements, the angular positions of the polarizer-analyzer assembly on rotation of the assembly 21, 24 may be indicated by a suitable calibrated dial 41 provided with a vernier scale, and carried on either of the mounts, and the angular position of the analyzer relatively to the polarizer may be indicated by a calibrated scale 42 provided on the mount 26 and cooperating with an index secured to the analyzer 24. A disconnectable coupling, removable pinion 31, is provided for displacing the analyzer 24 independently of the polarizer 21.

In one form of embodiment means are provided for rotating both quarter-wave plates 32 and 33 within their respective mounts and means for indicating the angle of rotation.

Means may further be provided for interposing in front of the analyzer sensitive colored plates or bi-refringent elements or the like, or compensating plates such as quartz (Babinet type) compensators, penumbra compensators, or the like, in order to increase the accuracy of the measurements if desired.

The apparatus thus makes it possible to determine quickly and accurately the directions of the principal strains in the test piece, by scanning the isoclinic lines and also to determine the values of the differences between the principal strains.

The high mobility of the apparatus makes possible qualitative and quantitative tests in workshops and similar industrial fields e.g. for inspection of glassware and plastic articles or for the inspection of photo-elastic coatings and plates, as well as for the investigation of photo-elastimetrical models.

Since all the components of the apparatus are positioned on the same side relatively to the tested article, a multiplicity of articles may readily be tested in succession either by moving the apparatus past the articles or the articles past the apparatus. Desirably a reflective screen is disposed behind the articles to be tested, such as an aluminum sheet; or in the case where photo-elastic coatings or plates are to be tested the test surface itself may serve as a reflector; or further, in the case of models being tested according to conventional photo-elastimetrical procedure, an aluminum sheet or similar reflector may be placed behind the translucent model; or again the rear surface of the test assembly may be painted with a reflective coating or metallized.

The apparatus described may be used at large or small distances from the objects to be tested. For very remote objects the apparatus may be fitted with binocular glasses.

For objects positioned at short distances the apparatus may be provided with means providing suitable magnification, e.g. a microscope or any other suitable optical instrument.

The light source may have stroboscopic means associated with it for investigation of dynamic phenomena and the like.

A photographic or kinematographic camera, photoelectric cell or other suitable sensitive unit may be substituted in place of the observer's eye.

What is claimed is:
1. A large field polariscope for normal incidence photoelastic observations, said polariscope comprising a generally flat body, first and second annular mounting members rotatably positioned on said body for rotation respectively about first and second axes normal to said body, disconnectable coupling means enforcing equiangular rotation of said first and second members when connected therebetween, a sheet material polarizer defining a first plane of polarization for transmitted light attached to said first member, a sheet material analyzer defining a second plane of polarization for transmitted light attached to said second member, a third annular mounting means hingedly attached to said first member for rotation about a third axis spaced from and normal to a radius of said first member and spaced radially from said first axis, a fourth annular mounting member hingedly attached to said second mounting member for rotation about a fourth axis spaced from and normal to a radius of said second member and spaced radially from said second axis independently of rotation of said third mounting member, and sheet material quarter-wave plates attached to said third and fourth mounting members, whereby regardless of equiangular or other relative rotation of said first and second mounting members about said first and second axes, a predetermined angular orientation of said quarter-wave plates relative to said analyzer and said polarizer is automatically reproduced upon rotation of said third and fourth mounting members about said third and fourth axes to respective overlying positions parallel and concentric with said first and second mounting members respectively.

2. The polariscope of claim 1 in which the first quarter-wave plate and the analyzer are relatively oriented to form a circular polarizer when said third mounting member is overlyingly positioned parallel and co-axial with said first mounting member and in which said second quarter-wave plate and said analyzer are relatively oriented to form an analyzer for circularly polarized light when said fourth mounting member is overlyingly positioned parallel to co-axial with said second mounting member.

References Cited in the file of this patent

UNITED STATES PATENTS

| | | |
|---|---|---|
| 1,881,132 | Rheinberg | Oct. 4, 1932 |
| 2,102,632 | Land | Dec. 21, 1937 |
| 2,184,015 | McFarlane | Dec. 19, 1939 |
| 2,206,303 | Neumueller et al. | July 2, 1940 |
| 2,210,882 | Carter | Aug. 13, 1940 |
| 2,237,565 | Land | Apr. 8, 1941 |
| 2,334,418 | Land | Nov. 16, 1943 |
| 2,383,186 | Glasser | Aug. 21, 1945 |
| 2,457,799 | Altenberg | Jan. 4, 1949 |
| 2,719,565 | Wolff | Oct. 4, 1955 |
| 2,909,958 | Hildebrand | Oct. 27, 1959 |

FOREIGN PATENTS

| | | |
|---|---|---|
| 676,725 | Great Britain | July 30, 1952 |
| 78,968 | Netherlands | Sept. 15, 1955 |